United States Patent [19]
Maeda et al.

[11] Patent Number: 5,089,456
[45] Date of Patent: Feb. 18, 1992

[54] PROCESS FOR PREPARING CORDIERITE

[75] Inventors: Kazuyuki Maeda; Fujio Mizukami; Shuichi Niwa; Makoto Toba; Kazuo Shimizu, all of Tsukuba, Japan

[73] Assignee: Agency of Industrial Science & Technology, Tokyo, Japan

[21] Appl. No.: 606,281

[22] Filed: Oct. 31, 1990

[30] Foreign Application Priority Data

Nov. 6, 1989 [JP] Japan .................. 1-288432

[51] Int. Cl.$^5$ .................. C04B 35/02; C03C 10/08
[52] U.S. Cl. .................. 501/119; 501/12; 501/128; 501/153; 423/329; 423/331; 423/528; 423/600
[58] Field of Search .............. 501/12, 121, 128, 122, 501/119, 9, 153; 423/329, 528, 331, 600

[56] References Cited

U.S. PATENT DOCUMENTS 4,888,314  12/1989  Bernier et al. .................. 501/119
4,898,842   2/1990  David .................. 501/119

OTHER PUBLICATIONS

Suzuki et al, *Journal of Ceramic Society of Japan*, "Preparation of Cordierite Ceramics from Metal Alkoxides (Part I)", vol. 95, pp. 163–169 (1987).

Suzuki et al, *Journal of Ceramic Society of Japan*, "Preparation of Cordierite Ceramics from Metal Alkoxides (Part II)", vol. 95, pp. 170–175 (1987).

Pouxviel et al, *Journal of Non-Crystalline Solids*, "NMR Study of the Sol/Gel Polymerization", vol. 89, pp. 345–360 (1987).

*Primary Examiner*—Mark L. Bell
*Assistant Examiner*—C. Melissa Bonner
*Attorney, Agent, or Firm*—Armstrong, Nikaido, Marmelstein, Kubovcik & Murray

[57] ABSTRACT

A process for preparing a cordierite, which includes dissolving a silicon compound, an aluminum compound and a magnesium compound in a molar ratio of 1:0.7 to 1:0.3 to 0.5 in a complexing agent represented by the formula $R(OCH_2CH_2)_nOH$, wherein R is an alkyl group and n is an integer of 1 to 4; heating the resulting solution to bring about a ligand exchange reaction of the silicon compound, aluminum compound and magnesium compound with the complexing agent; conducting hydrolysis to form a gel; drying the gel and sintering the dried gel at 800° to 1450° C.

5 Claims, No Drawings

PROCESS FOR PREPARING CORDIERITE

BACKGROUND OF THE INVENTION

The present invention relates to a process for preparing cordierite. More particularly, the invention relates to a process for preparing cordierite used for materials wherein chemical stability, heat resistance, low coefficient of thermal expansion, thermal shock resistance, etc., are required, such as exhaust gas cleaning catalysts for automobiles, carriers for combustion catalysts for fan heaters and heat exchangers for gas turbine engines, and materials wherein insulation properties and low dielectric constant are required, such as IC substrate materials for high-speed devices.

Cordierite ceramics having a high thermal impact resistance have hitherto been used for honeycomb carriers widely used as exhaust gas cleaning catalysts for automobiles and carriers for combustion catalysts of domestic fan heaters. There is an ever-increasing demand for the cordierite due to an increase in the production of automobiles and various combustion equipment. Further, the cordierite has drawn attention also as IC substrate materials for high speed devices by virtue of its low dielectric constant and high insulation properties.

However, in prior art processes, such as a process wherein a starting powder mixture is sintered to prepare a sinter and a process wherein a starting mixture is melted and crystallized from glass, the temperature of forming α-cordierite is high and the sintering temperature is very close to the incongruent melting temperature (1445° C.), so that it is difficult to prepare a cordierite sinter in a pure single phase. For this reason, in general, a sintering aid, such as titanium oxide or an oxide of an alkali metal or an alkaline earth metal has been added.

However, in this method, it is difficult to control the degree of sintering, which brings about an increase in both the coefficient of thermal expansion and dielectric constant of the resultant cordierite.

In recent years, a partial hydrolysis process for an ester of silicic acid has been reported as a process by which cordierite can be formed at a temperature below that used in the conventional process (see Journal of Ceramic Society of Japan, 1987, vol. 95, pp. 163-169; ibid., pp. 169-175).

The above-described partial hydrolysis process is one wherein among alkoxides of silicon, aluminum and magnesium used as starting materials, ethyl silicate which exhibits a particularly low hydrolysis rate is preliminarily hydrolyzed with a small amount of dilute hydrochloric acid. According to this process, it is possible to prepare α-cordierite in a single phase through sintering at 1200° C. for 2 hr.

In this process, however, a very long reaction time, i.e., 100 hr at 70° C., is necessary for partial hydrolysis of tetraethoxysilane. Further, if the partial hydrolysis time is shortened to one half, no pure α-cordierite can be prepared even after sintering at 1400° C. for 2 hr and instead a mixture of many compounds is formed. Therefore, in order to prepare a pure product, it is necessary to carefully control the reaction.

In the above-described hydrolysis process, it may be anticipated that a part or whole of the alkoxy groups of the ester might be hydrolyzed to give a silanol type ester [see the following formula (1)].

In practice, however, it is known that the silanol type chemical species is converted into a high-molecular weight chemical species through polycondensation [see the following formula (2); J. C. Pouxviel et al., Journal of Non-Crystalline Solids, 89, 345-360 (1987)].

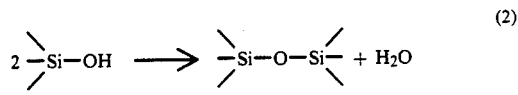

This makes it inevitable to use a high-molecular weight compound as the silicon source.

Therefore, the partial hydrolysis process cannot be thought to be a process wherein an advantage of the liquid phase process that a homogeneous mixing of a multi-component system can be achieved through the use of a low-molecular weight starting material can be fully utilized.

SUMMARY OF THE INVENTION

An object of the present invention is to provide a process for easily preparing a pure and homogeneous cordierite ceramics with a high reproducibility.

The above object of the present invention can be attained by dissolving a silicon compound, an aluminum compound and a magnesium compound in a molar ratio of 1:0.7 to 1:0.3 to 0.5 in a complexing agent represented by the formula $R(OCH_2CH_2)_nOH$, wherein R is an alkyl group and n is an integer of 1 to 4; heating the resulting solution to bring about a ligand exchange reaction of the above-described silicon compound, aluminum compound and magnesium compound with the complexing agent; conducting hydrolysis to form a gel; drying the gel and sintering the dried gel at 800° to 1450° C.

DETAILED DESCRIPTION OF THE PREFERRED EMBODIMENTS

The present inventors have conducted extensive and intensive studies on the behavior of hydrolysis of a mixed metal alkoxide and, as a result, have found that a ligand exchange reaction of a mixed metal alkoxide with a complexing agent functions as a polydentate ligand to prepare a mixed alkoxide precursor followed by the hydrolysis of the precursor enables the hydrolysis rate of each starting material to be adjusted so as to be uniformed even when any kind of a metal alkoxide is used as a starting material. Further, they have found that when the above-described complexing agent or a diluted complexing agent is used as a solvent for the ligand exchange reaction, it is possible to form a homogeneous cordierite precursor gel without resort to the partial hydrolysis. The present invention has been accomplished on the basis of this finding.

In the present invention, a silicon compound, an aluminum compound and a magnesium compound each soluble in the complexing agent as the solvent are used as the starting materials. Specifically, the silicon compound, aluminum compound and magnesium compound may be any kind as far as all of them are soluble in the following complexing agents and can bring about a ligand exchange reaction with the complexing agent, though alkoxides, nitrates, chlorides, organic acid salts, etc., of silicon, aluminum and magnesium are generally used.

Ethoxides, methoxides, isopropoxides, n-propoxides, n-butoxides, sec-butoxides, tert-butoxides, etc., are generally preferred as the alkoxide from the viewpoint of price, availability, handleability, etc. Acetates, lactates, oxalates, etc., may be used as the organic acid salt.

A cordierite suitable for practical use may be prepared when the aluminum compound and the magnesium compound are used in respective amounts of 0.7 to 1 mol and 0.3 to 0.5 mol per mole of the silicon compound. However, in order to prepare a pure cordierite having a composition of $Mg_2Al_4Si_5O_{18}$, it is preferred to use the aluminum compound and the magnesium compound in respective amounts of 0.8 mol and 0.4 mol per mole of the silicon compound.

In the present invention, a complexing agent represented by the general formula $R(OCH_2CH_2)_nOH$ or a diluted complexing agent is used, and as described above the complexing agent functions as a solvent for the starting compounds. Any complexing agent may be used as far as it has a boiling point of 120° C. or above and can be distilled under a reduced pressure. In the above-described general formula, in general, R is a methyl, ethyl, propyl or butyl group and n is an integer of 1 to 4. These complexing agents may be used alone or in the form of a mixture of two or more of them and further may be used after dilution with a diluent. Any diluent may be used as far as it has a boiling point of 120° C., can be distilled under a reduced pressure, brings about a homogeneous solution without formation of any precipitate when starting compounds are dissolved in the diluted organic solvent, and has a capability of coordinating with a metal ion inferior to that of the above-described complexing agent. Higher alcohols, polyethers and their mixtures are generally used as the diluent.

The amount of the complexing agent is an important factor for controlling the formation of the mixed alkoxide precursor. When the amount of tetraethoxysilane is y, L (mole) determined by the following equation is a theoretical amount of the complexing agent necessary for completing the ligand exchange:

$$L(mole) = 4 \times y + 3 \times (4/5 \times y) + 2 \times (2/5 \times y)$$

When the amount of use of the complexing agent is 0.25 L (mole), a multicomponent mixture having a high sapphirine content is prepared. On the other hand, when the complexing agent is used in an amount of 0.5 L (mole) or more, a pure α-cordierite is prepared at a temperature of 1000° to 1100° C. or below. However, when the complexing agent is excessively large, the organic material remains in a large amount in the gel even after hydrolysis and incurs danger during sintering. Further, the use of an unnecessarily excessive amount of the organic material is unfavorable also from the viewpoint of economy. For this reason, the amount of use of the complexing agent is 0.05 to 100 L, preferably 0.5 to 10 L.

In the present invention, the above-described starting compounds are dissolved in the above-described solvent, and the resultant solution is heated for a ligand exchange reaction. This reaction is represented, e.g., by the following formula:

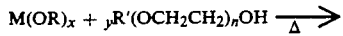

-continued

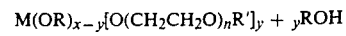

wherein
M = Si, Al, Mg;
R = $CH_3$, $CH_3CH_2$, $CH_3CH_2CH_2CH_2$, etc.;
R' = $CH_3$, $CH_3CH_2$, $CH_3CH_2CH_2$, etc; and
n = 1–4.

The reaction may be conducted at any temperature as far as the dissolution and the progress of the reaction can be achieved. When the temperature is below 120° C., the magnesium compound hardly dissolves and the ligand exchange reaction hardly proceeds rapidly. Therefore, the temperature is preferably 120° C. or above. When the temperature is excessively high, the formed mixed alkoxide precursor structure is broken unfavorably. In the present invention, the reaction temperature is generally 70° to 250° C., preferably 120° to 190° C.

The reaction time may be arbitrary as far as it is longer than the time necessary for the dissolution of the starting materials. However, the ligand exchange and the formation of the mixed alkoxide precursor need some additional time although the necessary additional time depends upon the reaction temperature and the amount of the complexing agent. On the other hand, when the reaction time is excessively long, the formed mixed alkoxide precursor is broken unfavorably. Therefore, in the present invention, the reaction time is 5 min to 120 hr, preferably 20 min to 24 hr. A small amount of a catalyst, such as hydrochloric acid, may be added during the ligand exchange reaction. However, cordierite can be similarly prepared without the addition of any catalyst. Therefore, the process of the present invention is advantageous in that there is no need of using a catalyst.

In the present invention, the reaction mixture is hydrolyzed after the ligand exchange reaction.

When the amount of water used in the hydrolysis is excessively small, a large amount of the organic material remains in a gel after drying and often incurs danger during sintering and further causes carbon to remain in the formed cordierite. When the amount of tetraethoxysilane is y, H (mole) determined by the following equation is a theoretical amount of water necessary for completing the hydrolysis:

$$H(mole) = 4 \times y + 3 \times (4/5 \times y) + 2 \times (2/5 \times y)$$

Cordierite can be formed when the amount of use of water is 0.5 H or more. The amount is preferably 1 H to 200 H. When the temperature at which water is added is excessively high, the difference in hydrolysis rates among individual components becomes so large that it becomes difficult to bring about gelation. Therefore, in the present invention, the temperature at which water is added is generally 0° to 90° C., preferably 0° to 40° C. Water may directly be added. Alternatively, water may be added after dilution with a suitable solvent such as a lower alcohol.

According to the present invention, the solution after the hydrolysis forms a gel via a sol. The gelation temperature is generally 0° to 90° C., preferably 0° to 40° C. Further, in the present invention, it is possible to conduct molding into an arbitrary shape in the stage of a sol.

In the drying of the gel, the gel may be heated and dried as it is. Alternatively, it is also possible to conduct the drying by any desired method such as vacuum drying and freeze drying. Further, a sol or an undried gel may be applied to other substance and then dried by a desired method. Further, it is also possible to wash an undried gel or a dried gel with water or aqueous hydrogen peroxide to remove the residual organic material.

After drying, in order to prepare cordierite, it is necessary to incinerate the organic material remaining in the dried gel by firing for crystallization of cordierite. According to the present invention, the crystallization starts at 800° C. and substantially pure α-cordierite is prepared at 1000° C. Since cordierite incongruently melts at 1445° C., it is preferred to lower the maximum firing temperature below the incongruent melting temperature. For this reason, in the present invention, the firing temperature is 800° to 1450° C., preferably 1000° to 1445° C. Prior to the firing, the dried gel may be calcined in an inert gas atmosphere, such as nitrogen, argon or helium. This is important also from the viewpoint of preventing explosion caused by the rapid combustion of an organic material in the gel when the amount of the firing sample is large.

The present invention will now be described in more detail by way of the following Examples and Comparative Examples.

EXAMPLE 1

A 500-ml short-necked Kjeldahl flask was charged with 0.137 mol of alminum isopropoxide, 0.171 mol of tetraethoxysilane and 0.069 mol of magnesium diethoxide, and 1.01 mol of diethylene glycol monomethyl ether was added thereto. The mixture was heated in an oil bath at 150° C. for 1 hr while stirring. The temperature of the oil bath was lowered to room temperature, and the reaction mixture was then cooled to 5° C. A mixture of 133 ml of water with 68.5 ml of ethanol was added thereto, and the resultant mixture was stirred at 10° C. This caused a transparent agar-like gel to be formed about 7 hr after the initiation of the stirring. This gel was dried under a reduced pressure at 50° to 190° C., calcined at 300° C. for 1 hr and then at 600° C. for 2 hr, and finally fired at 1000° C. for 2 hr to prepare α-cordierite.

EXAMPLE 2

A 200-ml beaker was charged with 4.84 g of aluminum isopropoxide, 5.21 g of tetraethoxysilane and 1.14 g of magnesium diethoxide. 21.6 g of diethylene glycol monomethyl ether and 0.02 ml of 10% hydrogen chloride/methanol were added thereto. The mixture was heated in an oil bath at 145° C. for 1 hr while stirring. The temperature of the oil bath was lowered to 30° C. and a mixture of 32.4 ml of water with 32.5 ml of ethanol was added thereto. The resultant mixture was stirred at room temperature to cause a soft jelly-like gel to be formed about 5.5 hr after the initiation of the stirring. This gel was dried at a maximum temperature of 170° C. under a reduced pressure, calcined at 400° C. for 1 hr and then at 800° C. for 3 hr, and finally fired at 1020° C. for 2 hr to prepare α-cordierite.

EXAMPLE 3

A 1-l short-necked Kjeldahl flask was charged with 0.21 mol of aluminum isopropoxide, 0.265 mol of ethyl silicate and 0.11 mol of magnesium diethoxide, and 2.76 mol of diethylene glycol monomethyl ether was added thereto. The mixture was heated in an oil bath at 150° C. for 1 hr while stirring. The temperature of the oil bath was lowered to room temperature. Thereafter, 5.4 mol of water diluted with ethanol was added thereto. The mixture was stirred at room temperature for 8 hr, thereby preparing a gel. The gel was dried under a reduced pressure at a temperature of 50° to 190° C., calcined at 300° C. for 1 hr and then at 800° C. for 2 hr, and finally fired at 1000° C. for 2 hr to prepare α-cordierite.

EXAMPLE 4

A 300-ml short-necked Kjeldahl flask was charged with 10.2 g of aluminum isopropoxide, 13.0 g of tetraethoxysilane and 2.86 g of magnesium diethoxide, and 0.6 equivalent, based on the total alkoxide, of diethylene glycol monomethyl ether was added thereto. The mixture was heated in an oil bath at 156° C. for 1 hr while stirring. The reaction vessel was ice-cooled, and a mixture of 97.2 ml of water with 48.6 ml of ethanol was added thereto. The resultant mixture was stirred at room temperature to cause a transparent agar-like gel to be formed about 11 hr after the initiation of the stirring. The resultant gel was dried at 50° to 200° C. and fired as it was at 1100° C. for 2 hr to prepare α-cordierite.

EXAMPLE 5

A 200-ml beaker was charged witn 50.4 mmol of aluminum isopropoxide, 63.3 mmol of tetraethoxysilane and 25.1 mmol of magnesium diethoxode. 451 mmol of diethylene glycol mono-n-butyl ether was added thereto. The mixture was heated in an oil bath at 150° C. for 4 hr while stirring. The temperature of the oil bath was lowered to room temperature, and a mixture of 1350 mmol of water with 264 mmol ethanol was added to the reaction mixture. The mixture was stirred at room temperature to prepare a gel. The gel was dried in vacuo at a temperature of 50° to 180° C., calcined at 300° C. for 1 hr and then at 600° C. for 2 hr, and finally fired at 1100° C. for 1 hr to prepare α-cordierite.

EXAMPLE 6

A 1-l small-necked Kjeldahl flask was charged with 0.234 mol of aluminum isopropoxide, 0.293 mol of ethyl silicate and 0.117 mol of magnesium diethoxide, and 3.16 mol of diethylene glycol monomethyl ether was added thereto. The mixture was heated in an oil bath at 120° C. for 5 hr while stirring. The temperature of the oil bath was lowered to room temperature. Thereafter, a mixture of 56.9 g of water with 28.3 g of methanol was added thereto. The mixture was stirred at room temperature for 8 hr, dried in vacuo at 50° to 190° C., calcined at 300° C. for 1 hr, then at 600° C. for 1 hr and further at 800° C. for 1 hr, and finally fired at 1000° C. for 2 hr to prepare α-cordierite.

EXAMPLE 7

A 500-ml short-necked Kjeldahl flask was charged with 20.5 g of aluminum isopropoxide, 26.1 g of tetraethoxysilane and 5.83 g of magnesium diethoxide. 148 g of triethylene glycol monomethyl ether was added thereto. The mixture was heated in an oil bath at 150° C. for 4 hr while stirring. The temperature of the oil bath was lowered to room temperature, and a mixture of 3.6 mol of water with 0.7 mol of ethanol was added to the reaction mixture. The mixture was stirred at room temperature to prepare a gel. The gel was dried in vacuo at a temperature of 50° to 190° C., calcined at 300° C. for 1 hr and then at 600° C. for 2 hr, and finally fired at 1020° C. for 2 hr to prepare α-cordierite.

EXAMPLE 8

A 100-ml short-necked Kjeldahl flask was charged with 2.47 g of aluminum isopropoxide, 3.17 g of tetraethoxysilane and 0.68 g of magnesium diethoxide. 13.1 g of diethylene glycol monomethyl ether was added thereto. The mixture was heated in an oil bath at 150° C. for 21 hr while stirring.

The temperature of the oil bath was lowered to room temperature, and a mixture of 13.0 mol of water with 6.4 mol of ethanol was added to the reaction mixture. The mixture was stirred at room temperature to prepare a gel. The gel was dried in vacuo at a temperature of 70° to 170° C., calcined at 300° C. for 1 hr and then at 800° C. for 2 hr, and finally fired at 1020° C. for 2 hr to prepare α-cordierite.

EXAMPLE 9

A 500-ml three-necked flask equipped with a distillation device was charged with 20.3 g of aluminum isopropoxide, 25.9 g of ethyl silicate and 5.7 g of magnesium diethoxide. 0.85 mol of diethylene glycol monomethyl ether was added thereto. The mixture was heated in an oil bath at 170° C. for 4 hr while stirring. The temperature of the oil bath was lowered to room temperature, and a mixture of 63 g of water with 31 g of ethanol was added to the reaction mixture. The mixture was stirred at room temperature to prepare a gel. The gel was dried in vacuo at a temperature of 50° to 190° C., calcined at 300° C. for 1 hr, then at 600° C. for 1 hr and further at 800° C. for 1 hr, and finally fired at 1020° C. for 2 hr to prepare α-cordierite.

EXAMPLE 10

A 200-ml short-necked Kjeldahl flask was charged with 4.08 g of aluminum isopropoxide, 5.21 g of tetraethoxysilane and 1.14 g of magnesium diethoxide. 21.6 g of diethylene glycol monomethyl ether was added thereto. The mixture was heated in an oil bath at 150° C. for 1 hr while stirring. The temperature of the oil bath was lowered to room temperature, and 12.9 ml of 50% ethanol was added to the reaction mixture. The resultant mixture was stirred at room temperature to cause a jelly-like gel to be formed about 14 hr after the initiation of the stirring. The resultant gel was dried in vacuo at a temperature of 50° to 190° C., calcined at 400° C. for 1 hr and then at 800° C. for 3 hr, and finally fired at 1000° C. for 2 hr to prepare α-cordierite.

EXAMPLE 11

A 100-ml beaker was charged with 12.1 mmol of aluminum isopropoxide, 15.2 mmol of tetraethoxysilane and 6.0 mmol of magnesium diethoxide. 109 mmol of diethylene glycol monomethyl ether was added thereto. The mixture was heated in an oil bath at 150° C. for 35 min while stirring. The temperature of the oil bath was lowered to room temperature, and a mixture of 728 mmol of water with 139 mmol of ethanol was added to the reaction mixture. The mixture was stirred at room temperature, dried in vacuo at a temperature of 70° to 170° C., calcined at 300° C. for 1 hr and then at 800° C. for 2 h, and finally fired at 1020° C. for 2 hr to prepare α-cordierite.

EXAMPLE 12

A 500-ml short-necked Kjeldahl flask was charged with 68.4 mmol of aluminum isopropoxide, 85.7 mmol of ethyl silicate and 34.7 mmol of magnesium diethoxide. 503 mmol of diethylene glycol monomethyl ether was added thereto. The mixture was heated in an oil bath at 150° C. for 1 hr while stirring. The temperature of the oil bath was lowered to room temperature and the reaction vessel was cooled to 5° C. A mixture of 67.8 ml of water with 34.2 ml of ethanol was added to the reaction mixture. The mixture was stirred at 10° C. to cause a transparent agar-like gel to be formed about 7 hr after the initiation of the stirring. The resultant gel was dried in vacuo at a temperature of 50° to 190° C., washed with 500 ml of a 0.5% aqueous hydrogen peroxide, calcined at 300° C. for 1 hr and then at 600° C. for 2 hr, and finally fired at 1000° C. for 2 hr to prepare α-cordierite.

EXAMPLE 13

A 500-ml beaker was charged with 37.51 g of aluminum nitrate, 26.0 g of ethyl silicate and 12.8 g of magnesium nitrate. A mixture of 121 g of diethylene glycol monomethyl ether with 50 g of diethylene glycol diethyl ether was added thereto. When the mixture was heated in an oil bath at 150° C. for 2.5 hr, it solidified with evolution of $NO_x$. The temperature of the oil bath was lowered to room temperature. Then, a mixture of 65 g of water with 32 g of ethanol was added to the reaction mixture. The mixture was stirred at room temperature to form a gel. The resultant gel was dried in vacuo at a temperature of 50 to 190° C., calcined at 300° C. for 1 hr and then at 600° C. for 2 hr, and finally fired at 1100° C. for 1.5 hr to prepare α-cordierite.

COMPARATIVE EXAMPLE 1

A 500-ml short-necked Kjeldahl flask was charged with 0.11 mol of aluminum isopropoxide, 0.137 mol of tetraethoxysilane and 0.056 mol of magnesium diethoxide. 133 g of 2-propanol was added thereto, and the mixture was heated in an oil bath at 70° C. for 2 hr while stirring. The temperature of the oil bath was lowered to room temperature. Then, as soon as a mixture of 72 ml of water with 35 ml of ethanol was added to the reaction mixture, precipitates were formed. The precipitates were dried in vacuo at a temperature of 50° to 160° C., calcined at 300° C. for 1 hr and then at 800° C. for 1 hr, and finally fired at 1300° C. for 2 hr. As a result, a mixture mainly composed of crystobalite and containing sapphirine, cordierite, etc. was obtained.

COMPARATIVE EXAMPLE 2

A 500-ml beaker was charged with 20.4 g of aluminum isopropoxide, 26.0 g of ethyl silicate and 5.72 g of magnesium diethoxide. 121 g of 1-butanol was added thereto, and the mixture was heated in an oil bath at 100° C. for 5 hr while stirring. The temperature of the oil bath was lowered to room temperature. Then, a mixture of 64 g of water with 32 g of ethanol was added to the reaction mixture. The mixture was stirred at room temperature to make the mixture pasty. The resultant paste was dried in vacuo at a temperature of 50° to 170° C., calcined at 300° C. for 1 hr and then at 800° C. for 1 hr, and finally fired at 1300° C. for 2 hr. As a result, a multicomponent mixture mainly composed of crystobalite and containing sapphirine, mullite, cordierite, etc. was obtained.

COMPARATIVE EXAMPLE 3

A 500-ml short-necked Kjeldahl flask was charged with 91 mmol of aluminum isopropoxide, 113 mmol of tetraethoxysilane and 45 mmol of magnesium diethoxide. 814 mmol of diethylene glycol diethyl ether was added thereto, and the mixture was heated in an oil bath at 150° C. for 6 hr while stirring. However, the magnesium diethoxide could not completely be dissolved, so that no transparent solution was obtained. The temperature of the oil bath was lowered to room temperature. Then, as soon as a mixture of 58.5 ml of water with 35.2 ml of ethanol was added to the reaction mixture, precipitates were formed. The resultant precipitates were dried in vacuo at a temperature of 50° to 190° C., calcined at 300° C. for 1 hr and then at 600° C. for 2 hr, and finally fired at 1000° C. for 2 hr. As a result, a mixture mainly composed of sapphirine and crystobalite and containing mullite and α-cordierite was obtained.

COMPARATIVE EXAMPLE 4

A 500-ml beaker was charged with 20.4 g of aluminum isopropoxide, 26.2 g of tetraethoxysilane and 5.72 g of magnesium diethoxide. 146 g of diethylene glycol diethyl ether and 40.6 g of 1,4-butanediol were added thereto. As soon as the mixture was heated in an oil bath at 150° C. while stirring, a white precipitate occurred. After the stirring was continued for 5 hr, the temperature of the oil bath was lowered to room temperature. Then, a mixture of 64 g of water with 33 g of ethanol was added to the reaction mixture. The resultant mixture was stirred at room temperature. As a result, although hydrolysis gradually occurred, the solution became turbid and only fine precipitates were formed. The resultant precipitates were dried in vacuo at a temperature of 50° to 190° C., calcined at 300° C. for 1 hr and then at 900° C. for 2 hr, and finally fired at 1000° C. for 2 hr. As a result, only a mixture of mullite with spinel ($MgAl_2O_4$) and quartz was obtained while no cordierite was obtained.

COMPARATIVE EXAMPLE 5

A 500-ml beaker was charged with 18.8 g of aluminum nitrate, 13.0 g of ethyl silicate and 6.4 g of magnesium nitrate, and 84 g of lauryl alcohol was added thereto. The mixture was heated in an oil bath at 150° C. for 140 min while stirring. As a result, the mixture solidified with evolution of $NO_x$. The temperature of the oil bath was lowered to room temperature. Then, a mixture of 65 g of water with 32 g of ethanol was added to the reaction mixture, and the resultant mixture was stirred at room temperature. The formed precipitates were dried in vacuo at a temperature of 50° to 190° C., calcined at 300° C. for 1 hr, then at 600° C. for 3 hr and further at 800° C. for 1 hr, and finally fired at 1100° C. for 1.5 hr. As a result, only μ-cordierite was obtained, while no α-cordierite was obtained.

COMPARATIVE EXAMPLE 6

0.86 g of magnesium acetate, 0.60 g of precipitated silica and 0.61 g of aluminum hydroxide were pulverized and mixed with each other. The mixture was calcined at 600° C. for 1 hr and fired at 1300° C. for 2 hr. As a result, a mixture mainly composed of crystobalite and quartz and containing mullite, spinel and α-cordierite was obtained.

COMPARATIVE EXAMPLE 7

0.76 g of talc ($3MgO.4SiO_2.H_2O$), 0.90 g of kaolin ($Al_2O_3.2SiO_2.2H_2O$) and 0.66 g of aluminum hydroxide were pulverized and mixed with each other. The mixture was calcined at 600° C. for 1 hr and fired at 1300° C. for 2 hr. As a result, a mixture of mullite with α-cordierite was obtained.

As described above, according to the present invention, it is possible to prepare cordierite through firing at a temperature far below that of firing in not only powder mixing process (1400° C.) but also partial hydrolysis process (1200° C.). Further, as opposed to the partial hydrolysis, no complicated and delicate preliminary hydrolysis procedure in the presence of an acid catalyst is necessary, and the process of the present invention is not very limited as regards the kinds of the starting materials. Therefore, a mixed alkoxide precursor can be prepared in large quantities, stored for a long period of time and used in portions. This contributes to labor and time saving, so that it becomes possible to reduce the cost. Further, according to the process of the present invention, no additives other than the complexing agent and the alkoxide, nitrate and chloride as the strating materials, i.e., no sintering aid, such as an alkali metal or alkaline earth metal, is used, so that the cordierite after firing contains no impurity detrimental to the properties thereof.

The process of the present invention has a feature that the cordierite is prepared via a sol state. Therefore, the sol may be molded into a desired shape, or infiltrated into or applied to a support. Further, since the undried gel prepared in the process contains a polyether complexing agent, the undried gel may freely be molded or formed into a membrane or a fiber by making use of the complexing agent per se as an aid. Thus, the process of the present invention has immeasurable advantages.

Therefore, the process of the present invention is very excellent as a process for preparing a high purity cordierite for use in exhaust gas cleaning catalysts for automobiles, carriers for combustion catalysts for fan heaters and heat exchangers for gas turbine engines, etc., wherein chemical stability, heat resistance, low coefficient of thermal expansion and thermal shock resistance are required, or IC substrate materials for high-speed devices wherein insulation properties and low dielectric constant are required.

What is claimed is:

1. A process for preparing a cordierite, which comprises dissolving a silicon compound, an aluminum compound and a magnesium compound in a silicon/aluminum molar ratio of 1:0.7 to 1:1 and a silicon/magnesium molar ratio of 1:0.3 to 1:0.5 in a complexing agent represented by the formula $R(OCH_2CH_2)_nOH$, wherein R is an alkyl group and n is an integer of 1 to 4; heating the resulting solution to bring about a ligand exchange reaction of said silicon compound, aluminum compound and magnesium compound with said complexing agent; conducting hydrolysis to form a gel; drying the gel and sintering the dried gel at 800° to 1450° C.

2. A process according to claim 1, wherein the molar ratio of the silicon compound, aluminum compound and magnesium compound is 1:0.8:0.4.

3. A process according to claim 1, wherein said silicon compound, aluminum compound and magnesium compound are each at least one compound selected from the group consisting of alkoxides, nitrates, chlorides and organic acid salts thereof.

4. A process according to claim 1, wherein the amount of use of the complexing agent is 0.05 to 100 L, wherein L is a value determined by the following equation:

$$L(\text{mole}) = 4 \times y + 3 \times (4/5 \times n) + 2 \times (2/5 \times n),$$

wherein n is the number of moles of said silicon compound.

5. A process according to claim 1, wherein said ligand exchange reaction temperature is 70° to 250° C.

* * * * *